(12) United States Patent
Dornbusch et al.

(10) Patent No.: US 8,399,061 B2
(45) Date of Patent: Mar. 19, 2013

(54) ANTI-CORROSION AGENT FORMING A COATING FILM WITH GOOD ADHESION AND METHOD FOR NONGALVANIC APPLICATION THEREOF

(75) Inventors: Michael Dornbusch, Ludenscheid (DE); Elke Austrup, Nordkirchen (DE); Horst Hintz-Bruning, Munster (DE)

(73) Assignee: BASF Coatings GmbH, Munster (DE)

( * ) Notice: Subject to any disclaimer, the term of this patent is extended or adjusted under 35 U.S.C. 154(b) by 713 days.

(21) Appl. No.: 12/514,677

(22) PCT Filed: Sep. 19, 2007

(86) PCT No.: PCT/EP2007/008132
§ 371 (c)(1),
(2), (4) Date: May 13, 2009

(87) PCT Pub. No.: WO2008/058586
PCT Pub. Date: May 22, 2008

(65) Prior Publication Data
US 2010/0040798 A1    Feb. 18, 2010

(30) Foreign Application Priority Data
Nov. 13, 2006   (DE) .................. 10 2006 053 291

(51) Int. Cl.
*B05D 1/18*   (2006.01)
*B05D 3/00*   (2006.01)
(52) U.S. Cl. .................. 427/327; 427/430.1; 427/435
(58) Field of Classification Search ........... 427/327–330
See application file for complete search history.

(56) References Cited

U.S. PATENT DOCUMENTS

| | | | |
|---|---|---|---|
| 3,922,253 A | 11/1975 | Jerabek et al. | |
| 3,964,936 A | 6/1976 | Das | |
| 4,017,438 A | 4/1977 | Jerabek et al. | |
| 4,031,050 A | 6/1977 | Jerabek | |
| 4,038,232 A | 7/1977 | Bosso et al. | |
| 4,101,486 A | 7/1978 | Bosso et al. | |
| 4,104,147 A | 8/1978 | Marchetti et al. | |
| 4,148,772 A | 4/1979 | Marchetti et al. | |
| 4,252,703 A | 2/1981 | Patzschke et al. | |
| 4,557,976 A | 12/1985 | Geist et al. | |
| 4,830,722 A | 5/1989 | Dobbelstein et al. | |
| 5,003,025 A | 3/1991 | Dobbelstein et al. | |
| 5,045,616 A * | 9/1991 | Rauterkus et al. | 526/258 |
| 5,196,487 A | 3/1993 | Kogure et al. | |
| 5,221,371 A | 6/1993 | Miller | |
| 5,338,434 A | 8/1994 | Ruhl et al. | |
| 5,494,535 A * | 2/1996 | Keller et al. | 148/251 |
| 5,567,761 A | 10/1996 | Song | |
| 6,312,812 B1 | 11/2001 | Hauser et al. | |
| 6,319,987 B1 * | 11/2001 | White et al. | 525/92 K |
| 7,388,044 B2 | 6/2008 | McGee et al. | |
| 2002/0096230 A1* | 7/2002 | Hardin et al. | 148/243 |
| 2003/0072950 A1* | 4/2003 | Rodrigues et al. | 428/437 |
| 2003/0130471 A1* | 7/2003 | Grandhee | 528/60 |
| 2003/0187145 A1 | 10/2003 | Martin et al. | |
| 2004/0143035 A1* | 7/2004 | Goebelt et al. | 523/200 |
| 2005/0096438 A1* | 5/2005 | Chang et al. | 525/374 |
| 2005/0238789 A1* | 10/2005 | Cholli et al. | 426/654 |
| 2008/0193662 A1 | 8/2008 | Dornbusch | |

FOREIGN PATENT DOCUMENTS

| | | |
|---|---|---|
| DE | 2701002 A1 | 7/1977 |
| DE | 3518732 A1 | 11/1986 |
| DE | 3518770 A1 | 11/1986 |
| DE | 3727382 A1 | 3/1989 |
| DE | 4119383 A1 | 12/1991 |
| DE | 19858708 A1 | 6/2000 |
| DE | 10005113 A1 | 8/2001 |
| DE | 10126651 A1 | 12/2002 |
| DE | 10206983 A1 | 9/2003 |
| DE | 10256226 A1 | 6/2004 |
| DE | 10322446 A1 | 12/2004 |
| DE | 10330413 A1 | 1/2005 |
| DE | 102005023728 A1 | 11/2006 |
| DE | 102005023729 A1 | 11/2006 |
| EP | 0004090 A2 | 9/1979 |
| EP | 0012463 A1 | 6/1980 |
| EP | 0102501 A1 | 3/1984 |
| EP | 0319017 A2 | 6/1989 |
| EP | 0534120 A1 | 3/1993 |
| EP | 0528853 B1 | 9/1994 |
| EP | 1217094 A2 | 6/2002 |
| EP | 1217094 A3 | 6/2002 |
| EP | 1217094 A3 | 7/2003 |
| EP | 1405933 A1 | 4/2004 |

(Continued)

OTHER PUBLICATIONS

International Search Report for PCT/EP2007/008132 dated Feb. 6, 2009.
International Preliminary Report on Patentability for PCT/EP2007/008132 dated Jun. 10, 2009.
International Preliminary Report on Patentability for International Application No. PCT/EP2006/003545 dated Dec. 6, 2007, 4 pages.
International Preliminary Report on Patentability for International Application No. PCT/EP2007/008136 dated Sep. 19, 2007, 6 pages.
International Preliminary Report on Patentability for International Application No. PCT/EP2007/010945 dated Oct. 6, 2009, 7 pages.
International Search Report for International Application No. PCT/EP2006/003545 mailed Jul. 26, 2006, 2 pages.
International Search Report for International Application No. PCT/EP2007/008136 mailed Nov. 20, 2007, 3 pages.
International Search Report for International Application No. PCT/EP2007/010945 mailed Apr. 29, 2008, 2 pages.

(Continued)

*Primary Examiner* — David Turocy
(74) *Attorney, Agent, or Firm* — Cantor Colburn LLP

(57) ABSTRACT

The invention relates to an aqueous coating material for metallic substrates, comprising a water-dispersible and/or water-soluble polymer P with a gradient in the concentration of covalently bonded hydrophilic groups along the main polymer chain, the polymer P having covalently bonded ligands A, which form chelates with the metal ions released during the corrosion of the substrate and/or with the substrate surface, and having crosslinking functional groups B, which with themselves, with further complementary functional groups B' of the polymer P and/or with further functional groups B and/or B' are able to form covalent bonds to crosslinkers V.

8 Claims, No Drawings

FOREIGN PATENT DOCUMENTS

| | | | |
|---|---|---|---|
| EP | 1455002 | A1 | 9/2004 |
| EP | 1217094 | B1 | 3/2005 |
| EP | 1571237 | A1 | 9/2005 |
| FR | 2859999 | A1 * | 3/2005 |
| WO | WO9512695 | A1 | 5/1995 |
| WO | W096/10461 | A1 | 4/1996 |
| WO | WO9912661 | A1 | 3/1999 |
| WO | W099/29927 | A2 | 6/1999 |
| WO | W001/46296 | A1 | 6/2001 |
| WO | WO0146495 | A2 | 6/2001 |
| WO | W001/86016 | A2 | 11/2001 |
| WO | WO0246518 | A2 | 6/2002 |
| WO | WO02086000 | A1 | 10/2002 |
| WO | WO03042275 | A1 | 5/2003 |
| WO | WO03051990 | A1 | 6/2003 |
| WO | WO03059971 | A1 | 7/2003 |
| WO | WO2004085556 | A1 | 10/2004 |
| WO | WO2005042801 | A1 | 5/2005 |

OTHER PUBLICATIONS

Machine English translation of DE 10 2005 023 728 A1, first published in German May 2005, 7 pages.

Opposition to EP 1 883 679, Title: "Corrosion-protection agent forming a layer of paint and method for current-free application thereof", Patentee: BASF Coatings GmbH, Munster, From: Henkel AG & Co. KGaA, Dusseldorf, Germany, to the European Patent Office, Munich, Dated: Jun. 22, 2011, Reference No. HE 07930 EP, 17 pages, English Translation.

English Translation of Written Opinion for International Application No. PCT/EP2006/003545 filed Apr. 19, 2006, 3 pages.

English Translation of Written Opinion for International Application No. PCT/EP2007/008132 issued Jun. 4, 2009, 8 pages.

Written Opinion for International Application No. PCT/EP2007/008136 mailed Nov. 20, 2007, 5 pages.

English Translation of Written Opinion for International Application No. PCT/EP2007/010945 issued Oct. 5, 2009, 6 pages.

* cited by examiner

ANTI-CORROSION AGENT FORMING A COATING FILM WITH GOOD ADHESION AND METHOD FOR NONGALVANIC APPLICATION THEREOF

CROSS REFERENCE TO RELATED APPLICATIONS

This application is a National Phase Application of Patent Application PCT/EP2007/008132 filed on 19 Sep. 2007, which claims priority to DE102006053291.0, filed 13 Nov. 2006, both of which are hereby incorporated by reference.

TECHNICAL FIELD

Processes and coating materials for the electroless corrosion-control coating of a variety of metal substrates.

BACKGROUND

In comparison to anodic or cathodic electrodeposition (AED or CED, respectively), where the application of electrical voltages is a requirement, electroless corrosion-control coating processes offer the advantage, in particular, of a simpler and less expensive operation and of a shorter operating time. The electroless processes make it possible, in particular, to coat cavities in or edges on the target substrates more effectively than using processes requiring the application of electrical voltages.

In the case of electroless corrosion-control coating, also called ACC (autophoretic chemical coating) process, polymers are generally used, examples being emulsion polymers containing acrylates or styrene/butadiene, which are anionically stabilized. As compared with the aforementioned AED and CED processes, however, the ACC processes have the drawback that the deposited coats exhibit defects which render the substrate significantly more susceptible to corrosion. Consequently, coats of this kind deposited by means of ACC processes are generally treated by rinsing with aqueous coating materials containing chromium, in order to improve corrosion control at the defects. Recently, however, it has turned out that chromium coating materials have great problems in terms of environmental compatibility, and are to be classified as highly hazardous to health. The aim is therefore completely to replace chromium in corrosion-control coatings.

In the train of the development of chromium-free coating materials it has been found, furthermore, that ACC coating materials comprising salts of the lanthanide elements and of the d elements and also an organic, film-forming component likewise ensure very good corrosion control, comparable with that of the chromium coating materials. WO-A-01/86016 describes a corrosion preventative comprising a vanadium component and a further component which comprises at least one metal selected from the group consisting of zirconium, titanium, molybdenum, tungsten, manganese, and cerium. A drawback of corrosion preventatives of WO-A-01/86016 type is the tendency of the metal ions formed from the substrate to migrate through the deposited corrosion-control coat, since the polymers result in deficient film formation.

WO-A-99/29927 describes a chromium-free, aqueous corrosion preventative whose components comprise hexafluoro anions of titanium(IV) and/or zirconium(IV), vanadium ions, transition-metal ions, and phosphoric and/or phosphonic acid. Disadvantages associated with corrosion preventatives of the WO-A-99/29927 type is the tendency of the metal ions formed from the substrate to migrate through the deposited corrosion-control coat, since the polymers result in deficient film formation, and the use of environmentally critical substances, such as hydrofluoric acid or fluorides in particular.

WO-A-96/10461 describes an aqueous corrosion preventative whose components comprise anions with a central atom selected from the group consisting of titanium, zirconium, hafnium, and silicon, and at least 4 fluorine-atom ligands, and an organic polymer dispersion. A drawback of the invention according to WO-A-96/10461 is that deposition of the corrosion preventative on the substrate surface is accompanied by flocculation of the polymer-dispersion particles, which makes their surface contact area small. Moreover, the latex particles have the drawback of a relatively low migration rate in the context of diffusion into cavities or onto edges of three-dimensional substrates, in comparison to polymers whose distribution is molecularly disperse. Moreover, coats with a thickness of between 1 micrometer and 1 mm are formed, entailing a corresponding consumption of material per unit area of the substrate to be coated. Further drawbacks include the tendency of the metal ions formed from the substrate to migrate through the deposited corrosion-control coat, and the use of environmentally critical substances, such as hydrofluoric acid or fluorides in particular.

DE-A-37 27 382 embraces chromium-free, aqueous dispersions of adducts of carboxylic acids and isocyanates with epoxides, which are suitable for autophoretic coating of metallic surfaces. In dispersed form such dispersions have a particle diameter of less than 300 nm, preferably between 100 and 250 nm, and after deposition on the metal surface can be crosslinked at temperatures between 60 and 200° C. Latex particles of this kind, too, have the drawback of having a relatively low migration rate in the context of diffusion into cavities or onto edges of three-dimensional substrates, in comparison to polymers whose distribution is molecularly disperse. Moreover, coats with a thickness of between 1 micrometer and 1 mm are formed, entailing a corresponding consumption of material per unit area of the substrate to be coated and a tendency to form cracks on drying. Further drawbacks include the tendency of the metal ions formed from the substrate to migrate through the deposited corrosion-control coat, and the use of environmentally critical substances, such as hydrofluoric acid or fluorides in particular.

DE-A-103 30 413 describes coating materials which are suitable for coating metallic surfaces and which may comprise caprolactam-modified polyisocyanates based on polyethyleneimines. The coating materials can be applied by deposition coating and, after drying, have thicknesses of between 1 and 300 micrometers. Coats produced in this way likewise require a high level of material and have a tendency to form cracks on drying.

In the light of the aforementioned prior art the problem addressed by the invention was that of finding a corrosion preventative which is largely unobjectionable from an environmental standpoint and which can be applied by a readily technically accomplishable operation to the substrate that is to be protected. In particular the corrosion preventative ought substantially to prevent the migration of the metal ions formed from the substrate and ought to be deposited effectively on edges and in cavities of the substrate. Furthermore, the tendency of the coat to form cracks on drying should in particular be kept as low as possible. Moreover, the effect of extraneous metal ions ought to be kept very low, and effective corrosion control ought to be obtained with a comparatively low level of material employed. In particular, the addition of polar corroding substances, such as particularly corroding salts, to the surface of the metal substrate should be effectively prevented. Furthermore, the conversion coating material ought to develop effective protection for as many different metal substrates as possible and ought to be substantially independent of the redox potential of the substrate to be coated.

SUMMARY

In the light of the aforementioned problems, an aqueous coating material has been found which comprises a water-dispersible and/or water-soluble polymer P with a gradient in the concentration of covalently bonded hydrophilic groups HG along the main polymer chain, the polymer P additionally containing covalently bonded ligands A which form chelates with the metal ions released in the course of substrate corrosion and/or with the substrate surface, and also, furthermore, having crosslinking functional groups B, which with themselves, with further functional groups B' of the polymer P and/or with further functional groups B and/or B' are able to form covalent bonds to crosslinkers V.

Also found has been a process for the autophoretic application of an aqueous coating material for metallic substrates featuring effective corrosion control, comprising a water-dispersible and/or water-soluble polymer P having a gradient in the concentration of covalently bonded hydrophilic groups HG along the main polymer chain, the polymer P additionally containing covalently bonded ligands A which form chelates with the metal ions released during substrate corrosion and/or with the substrate surface, and also, furthermore, having crosslinking functional groups B, which with themselves, with further functional groups B' of the polymer P and/or with further functional groups B and/or B' are able to form covalent bonds to crosslinkers V, the thickness of the coating material after autophoretic application being between 5 and 900 nm.

In a further preferred embodiment of the process of the invention, prior to the deposition of the corrosion preventative of the invention, in a further upstream process step, the substrate is pretreated with a corrosion preventative K.

DETAILED DESCRIPTION

The Coating Material of the Invention

The water-dispersible and/or water-soluble polymers P of the coating material of the invention have a gradient in the concentration of covalently bonded hydrophilic groups HG along the main polymer chain and carry ligands A, which form chelates with the metal ions released during the corrosion of the substrate, as well as crosslinking functional groups B, which are able with themselves and/or with further functional groups C to form covalent bonds to crosslinkers V.

For the purposes of the invention, water-dispersible or water-soluble means that the polymers P in the aqueous phase form aggregates having an average particle diameter of <50 nm, preferably <35 nm, and more preferably <20 nm, or else are in molecularly disperse solution. Such aggregates differ critically in their average particle diameter from dispersion particles, as are described, for example, in DE-A-37 27 382 or WO-A-96/10461. Polymers P in molecularly disperse solution generally have molecular weights of <100 000, preferably <50 000, and more preferably <20 000 daltons.

The size of the aggregates composed of polymer P may preferably come about, in conventional manner, through the introduction of hydrophilic groups HG on the polymer P.

Essential to the invention is that the hydrophilic groups HG form a gradient in their concentration along the main polymer chain. The gradient is defined by a gradient in the spatial concentration of the hydrophilic groups along the main polymer chain. Polymers P with this kind of construction are capable of forming micelles in the aqueous medium and have a surface activity on the surface of the substrate to be coated; in other words, the interfacial energy of the coating material of the invention at the surface to be coated is reduced.

The gradient is produced in conventional manner preferably by appropriate arrangement of monomeric units which constitute the polymer and which carry, inter alia, hydrophilic groups and/or groups for which hydrophilic groups HG can be produced.

Preferred hydrophilic groups HG on the polymer P are ionic groups such as, in particular, sulfate, sulfonate, sulfonium, phosphate, phosphonate, phosphonium, ammonium and/or carboxylate groups and also nonionic groups, such as, in particular, hydroxyl groups, primary, secondary and/or tertiary amine groups, amide groups and/or oligoalkoxy or polyalkoxy substituents, such as, preferably, ethoxylated or propoxylated substituents, which may have been etherified with further groups. The hydrophilic groups HG may be identical with the ligands A and/or crosslinking functional groups B and B' described below.

The number of hydrophilic groups HG on the polymer P depends on the solvation capacity and on the steric accessibility of the groups HG and can be adjusted by the skilled worker likewise conventionally.

Polymers which can be used as the backbone of the polymers P are arbitrary per se, preference being given to polymers having average molecular weights Mw of 500 to 50 000 daltons and more preference to those having molecular weights Mw of 700 to 20 000 daltons. Preferred backbone polymers used are polyolefins or poly(meth)acrylates, polyurethanes, polyalkyleneimines, polyvinylamines, polyalkyleneamines, polyethers, polyesters, and polyalcohols, which in particular are partially acetalized and/or partially esterified. The polymers P may be linear, branched and/or dendritic in construction. Especially preferred polymer backbones are polyalkyleneimines, polyvinylamines, polyalcohols and also, in particular, poly(meth)acrylates.

The polymers P are preferably stable to hydrolysis in the acidic pH range, in particular at pH values <5, more preferably at pH values <3.

Suitable ligands A are all groups or compounds which are able to form chelates with the metal ions released during the corrosion of the substrate. The ligands A are generally distributed randomly in the polymer P. Preference is given to monodentate and/or polydentate, potentially anionic ligands. Particularly preferred ligands are unfunctionalized or functionalized ureas and/or thioureas, especially acylthioureas such as benzoylthiourea, for example;

unfunctionalized or functionalized amines and/or polyamines, such as EDTA in particular;

unfunctionalized or functionalized amides, especially carboxamides;

imines and imides, such as imine-functionalized pyridines in particular;

oximes, preferably 1,2-dioximes such as functionalized diacetyldioxime;

organosulfur compounds, such as, in particular, unfunctionalized or functionalized thiols such as thioethanol, thiocarboxylic acids, thioaldehydes, thioketones, dithiocarbamates, sulfonamides, thioamides, and, with particular preference, sulfonates;

organophosphorus compounds, such as, in particular, phosphates, more preferably phosphoric esters of (meth)acrylates, and also phosphonates, more preferably vinylphosphonic acid and hydroxy-, amino- and amido-functionalized phosphonates;

unfunctionalized or functionalized organoboron compounds, such as boric esters in particular;

unfunctionalized or functionalized polyalcohols, such as, in particular, carbohydrates and their derivatives and also chitosans;

unfunctionalized or functionalized acids, such as, in particular, difunctional and/or oligofunctional acids, or unfunctionalized or functionalized (poly)carboxylic acids, such as, in particular, carboxylic acids, which may be attached ionically and/or coordinatively to metal centers, preferably (poly)methacrylates containing acid groups, or difunctional or oligofunctional acids;

unfunctionalized or functionalized carbenes;

acetylacetonates;

unfunctionalized or functionalized heterocycles such as quinolines, pyridines, such as in particular imine-functionalized pyridines, pyrimidines, pyrroles, furans, thiophenes, imidazoles, benzimidazoles, preferably mercaptobenzimidazoles, benzothiazoles, oxazoles, thiazole, pyrazoles or else indoles, unfunctionalized or functionalized acetylenes; and phytic acid and its derivatives.

Suitable crosslinking functional groups B on the polymer P are those which with themselves and/or with complementary functional groups B' are able to form covalent bonds. The crosslinking functional groups B are generally distributed randomly over the polymer P. Preferably the covalent bonds are formed thermally and/or by exposure to radiation. With particular preference the covalent bonds are formed thermally. The crosslinking functional groups B and B' result in the formation of an intermolecular network between the molecules of the polymer P. Functional groups B and/or B' which crosslink on exposure to radiation contain activable bonds, such as carbon-hydrogen, carbon-carbon, carbon-oxygen, carbon-nitrogen, carbon-phosphorus or carbon-silicon bonds, which may be single or double bonds. Carbon-carbon double bonds are particularly advantageous in this context. Especially suitable carbon-carbon double bonds as groups B are with particular preference (meth)acrylate groups ethyl acrylate groups vinyl ether groups and vinyl ester groups crotonate groups and cinnamate groups allyl groups dicyclopentadienyl groups norbornyl groups and isoprenyl groups isopropenyl groups or butenyl groups.

Thermally crosslinking functional groups B are able with themselves or, preferably, with complementary crosslinking functional groups B' to form covalent bonds on exposure to thermal energy.

Especially suitable thermally crosslinking functional groups B and B' are with particular preference hydroxyl groups mercapto groups and amino groups aldehyde groups azide groups acid groups, especially carboxylic acid groups acid anhydride groups, especially carboxylic anhydride groups acid ester groups, especially carboxylic ester groups ether groups with particular preference carbamate groups urea groups epoxide groups with particular preference isocyanate groups, which with very particular preference have been reacted with blocking agents which unblock at the baking temperatures of the coating materials of the invention and/or without unblocking are incorporated into the network that forms.

Particularly preferred combinations of thermally crosslinking groups B and complementary groups B' are:

hydroxyl groups with isocyanate and/or carbamate groups, amino groups with isocyanate and/or carbamate groups, and carboxylic acid groups with epoxide groups.

Particularly preferred polymers P comprise copolymers PM preparable by single-stage or multistage free-radical copolymerization in aqueous medium of a) olefinically unsaturated monomers (a1) and (a2), (a1) comprising in each case at least one monomer from the group consisting of olefinically unsaturated monomers (a11) having at least one hydrophilic group HG, from the group consisting of olefinically unsaturated monomers (a12) having at least ligand group A, and from the group consisting of olefinically unsaturated monomers (a13) having at least one crosslinking group B, and b) at least one olefinically unsaturated monomer which is different from the olefinically unsaturated monomers (a1) and (a2) and is of the general formula I $$R^1R^2C=CR^3R^4 \qquad (I)$$

in which the radicals $R^1$, $R^2$, $R^3$, and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$, and $R^4$ are substituted or unsubstituted aryl, arylalkyl or arylcycloalkyl radicals, especially substituted or unsubstituted aryl radicals.

Suitable hydrophilic monomers (a11) contain at least one hydrophilic group (HG) which, as described above, are selected preferably from the group consisting of sulfate, sulfonate, sulfonium, phosphate, phosphonate, phosphonium, ammonium and/or carboxylate groups and also hydroxyl groups, primary, secondary and/or tertiary amine groups, amide groups and/or oligoalkoxy or polyalkoxy substituents, such as, preferably, ethoxylated or propoxylated substituents, which may have been etherified with further groups.

Examples of highly suitable monomers (a11) are acrylic acid, methacrylic acid, ethacrylic acid, crotonic acid, maleic acid, fumaric acid or itaconic acid and their salts, preferably acrylic acid and methacrylic acid, olefinically unsaturated sulfonic, sulfuric, phosphoric or phosphonic acids, their salts and/or their partial esters. Also highly suitable are olefinically unsaturated sulfonium and phosphonium compounds. Also highly suitable are monomers (a11) which carry at least one hydroxyl group or hydroxymethylamino group per molecule and are essentially free from acid groups, such as, in particular, hydroxyalkyl esters of alpha,beta-olefinically unsaturated carboxylic acids, such as hydroxyalkyl esters of acrylic acid, methacrylic acid, and ethacrylic acid in which the hydroxyalkyl group contains up to 20 carbon atoms, such as, preferably, 2-hydroxyethyl, 2-hydroxypropyl, 3-hydroxypropyl, 3-hydroxybutyl, 4-hydroxybutyl acrylate and methacrylate, formaldehyde adducts of aminoalkyl esters of alpha,beta-olefinically unsaturated carboxylic acids and of alpha,beta-unsaturated carboxamides, such as N-methylol- and N,N-dimethylol-aminoethyl acrylate, -aminoethyl methacrylate, -acrylamide, and -methacrylamide. Suitable monomers (a11)

containing amine groups include the following: 2-aminoethyl acrylate and methacrylate, N-methyl- and N,N-dimethylaminoethyl acrylate, or allylamine. Monomers (a11) used that contain amide groups are preferably amides of alpha, beta-olefinically unsaturated carboxylic acids, such as (meth) acrylamide, preferably N-methyl- or N,N-dimethyl(meth) acrylamide. Ethoxylated or propoxylated monomers (a11) used are preferably acrylic and/or methacrylic esters of polyethylene oxide units and/or polypropylene oxide units whose chain length is preferably between 2 and 20 ethylene oxide or propylene oxide structural units.

Care should be taken when selecting the hydrophilic monomers (a11) to ensure that the formation of insoluble salts and polyelectrolyte complexes is prevented.

Examples of highly suitable monomers (a12) are olefinically unsaturated monomers which contain the above-described ligands A as substituents. Examples of suitable monomers (a12) are esters and/or the amides of acrylic acid, methacrylic acid, ethacrylic acid, crotonic acid, maleic acid, fumaric acid or itaconic acid, especially of acrylic and/or of methacrylic acid, which contain the ligands A in ester and/or amide residue. As ligands A it is preferred to use unfunctionalized or functionalized urea and/or thiourea substituents, unfunctionalized or functionalized amine and/or polyamine substituents, imine and imide substituents, such as imine-functionalized pyridines in particular, oxime substituents, preferably 1,2-dioximes such as functionalized diacetyldioxime, organosulfur substituents, such as, in particular, those derivable from unfunctionalized or functionalized thiols such as thioethanol, thiocarboxylic acids, thioaldehydes, thioketones, dithiocarbamates, sulfonamides, thioamides, and, with particular preference, sulfonates, organophosphorus substituents, such as, in particular, those derivable from phosphates, more preferably phosphoric esters of (meth) acrylates, and also phosphonates, more preferably vinylphosphonic acids and hydroxy-, amino-, and amido-functionalized phosphonates, unfunctionalized or functionalized organoboron substituents, such as, in particular, those derivable from boric esters, unfunctionalized or functionalized polyalcohol substituents, such as, in particular, those derivable from carbohydrates and their derivatives and also chitosans, unfunctionalized or functionalized acid substituent, such as, in particular, those derivable from difunctional and/or oligofunctional acids, or unfunctionalized or functionalized (poly)carboxylic acids, such as, in particular, carboxylic acids, which may be bonded ionically and/or coordinatively to metal centers, preferably (poly)methacrylates with acid groups or difunctional or oligofunctional acids, substituents with unfunctionalized or functionalized carbenes, acetylacetonates, unfunctionalized or functionalized acetylenes, and also phytic acids and derivatives thereof.

Examples of highly suitable monomers (a13) are olefinically unsaturated monomers which contain the above-described ligands B as substituents. Examples of suitable monomers (a13) are esters and/or the amides of acrylic acid, methacrylic acid, ethacrylic acid, crotonic acid, maleic acid, fumaric acid or itaconic acid, especially of acrylic and/or of methacrylic acid, which contain the crosslinking groups B in ester and/or amide residue. Particularly preferred crosslinking groups B are hydroxyl groups, and also, for example, mercapto groups and amino groups, aldehyde groups, azide groups, acid groups, especially carboxylic acid groups, acid anhydride groups, especially carboxylic anhydride groups, acid ester groups, especially carboxylic ester groups, ether groups, more preferably carbamate groups, examples being urea groups, epoxide groups, and also, with particular preference, isocyanate groups, which with very particular preference have been reacted with blocking agents which at the baking temperatures of the coating materials of the invention undergo deblocking and/or are incorporated, without deblocking, into the network as it forms.

The monomers (a11) are arranged in the polymer PM in such a way as to produce the above-described gradient of hydrophilic groups HG along the main polymer chain. This comes about in general through the specific copolymerization parameters of the different monomers (a11), (a12), (a13), (a2), and (b) in the aqueous reaction medium. The aforementioned monomers (a12) and (a13) are preferably arranged randomly along the main polymer chain. From the above listing of the exemplified monomers (a11), (a12), and (a13) it is apparent that the hydrophilic groups HG, the ligands A, and the crosslinking groups B may be partly or entirely identical. In this case, the ligands A and the crosslinking functional groups B also generally exhibit a gradient along the main polymer chain.

Examples of preferred olefinically unsaturated comonomers (a2) are
(1) substantially acid-group-free esters of olefinically unsaturated acids, such as alkyl or cycloalkyl esters, having up to 20 carbon atoms in the alkyl radical, of (meth)acrylic acid, crotonic acid, ethacrylic acid, vinylphosphonic acid or vinylsulfonic acid, especially methyl, ethyl, propyl, n-butyl, sec-butyl, hexyl, ethylhexyl, stearyl, and lauryl esters, cyclohexyl (meth)acrylate and also (meth)acrylic esters with mixed alkyl radicals, such as C13 (meth)acrylate, for example (linear alkyl radicals having on average 13 C atoms);
(2) vinyl esters of alpha-branched monocarboxylic acids having 5 to 18 carbon atoms in the molecule, such as the vinyl esters of Versatic® acid, which are sold under the brand name VeoVa®; and
(3) vinylaromatic hydrocarbons, such as styrene, vinyltoluene or alpha-alkylstyrenes, especially alpha-methylstyrene;

As monomers (b) use is made of compounds of the general formula I. In the general formula I the radicals $R^1$, $R^2$, $R^3$, and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$, and $R^4$ are substituted or unsubstituted aryl, arylalkyl or arylcycloalkyl radicals, especially substituted or unsubstituted aryl radicals.

Examples of suitable radicals $R^1$, $R^2$, $R^3$, and $R^4$ are further described for example in DE-A-198 58 708.

Examples of monomers (b) used with particular preference in accordance with the invention are diphenylethylene, dinaphthaleneethylene, cis- or trans-stilbene, vinylidenebis (4-N,N-dimethylaminobenzene), vinylidenebis(4-aminobenzene) or vinylidenebis(4-nitrobenzene). With regard to the reaction regime and the properties of the resulting copolymers (PM), diphenylethylene is especially advantageous and is therefore used with very particular preference in accordance with the invention.

For the preparation of the copolymers PM, preferably, the mixture of all the monomers is metered simultaneously into the water phase, the gradient of hydrophilic groups along the polymer chain becoming established as a result of the formation of oligomers or polymers with an initially high concentration of hydrophilic groups along the polymer chain, and the number of hydrophilic groups along the polymer chain decreasing in the course of further chain growth. The concentration gradient of the hydrophilic groups along the polymer chain may also be realized by the feeding of temporally and/or spatially different compositions of the monomer mixture of (a11), (a12), (a13), (a2), and (b), in a manner which is known per se. With regard to the preparation of the copolymers PM, reference may additionally be made to the teachings of DE-A-198 58 708, DE-A-102 06 983, and DE-A-102 56 226.

Suitable crosslinkers V containing groups B and/or B' which crosslink thermally and/or by exposure to radiation are, in principle, all crosslinkers known to the skilled worker. Preference is given to low molecular weight or oligomeric crosslinkers V, having a molecular weight of <20 000 daltons, more preferably <10 000 daltons. The backbone of the crosslinkers V that carries the crosslinking groups B and/or B' may be linear, branched and/or hyperbranched in construction. Preference is given to branched and/or hyperbranched structures, particularly those as described in, for example, WO-A-01/46296.

The crosslinkers V are preferably stable to hydrolysis in the acidic pH range, in particular at pH values <5, more preferably at pH values <3.

Particularly preferred crosslinkers V carry the above-described crosslinking groups B and/or B' which react with the crosslinking groups of the polymer P to form covalent bonds. Especially preferred crosslinkers V are those having groups B and/or B' which crosslink thermally and, if desired, additionally by exposure to radiation.

In one further particularly preferred embodiment of the invention the crosslinkers V, as well as the crosslinking groups B and/or B', carry ligands A', which may be identical with and/or different from the ligands A of the polymer P. Particularly suitable crosslinking functional groups B and B' for the crosslinkers V are:
- especially hydroxyl groups
- especially aldehyde groups
- azide groups
- acid anhydride groups, especially carboxylic anhydride groups
- carbamate groups
- urea groups
- especially isocyanate groups, which with very particular preference are reacted with blocking agents which unblock at the baking temperatures of the coating materials of the invention and/or without deblocking are incorporated into the network which forms
- (meth)acrylate groups
- vinyl groups or combinations thereof.

Especially preferred crosslinkers V are branched and/or hyperbranched polyisocyanates which are at least partly blocked and which additionally carry ligands A.

In one further embodiment of the invention the crosslinkers V carry groups B and/or B' which are capable of forming covalent bonds with the ligands L of the polymer P.

The continuous phase used for the coating material of the invention is water, preferably deionized and/or distilled water. Additionally it is possible for there to be largely water-miscible solvents present in the continuous phase, in fractions of up to 30% by weight, preferably up to 25% by weight, based on the continuous phase. Preferred water-miscible solvents are ethanol, propanol, methyl ethyl ketone, and N-ethylpyrrolidone. Particularly when the coating materials of the invention are used in the repair of paint damage on substrates which have already been painted, the water-miscible solvents are used in fractions of 1% to 30% by weight, based on the continuous phase, preferably in fractions of 2% to 25% by weight.

A further preferred component used is at least one acid capable of oxidation, which is used such that the pH of the coating material of the invention is preferably between 1 and 5, more preferably between 2 and 4. Particularly preferred acids are selected from the group consisting of oxidizing mineral acids, such as, in particular, nitric acid, nitrous acid, sulfuric acid and/or sulfurous acid. To adjust the pH it is possible, where necessary, to use a buffer medium, such as, for example, salts of strong bases and weak acids, such as ammonium acetate in particular.

In one particularly preferred embodiment of the invention the coating material of the invention further comprises a salt having as its cationic constituent lanthanide-metal cations and/or d-metal cations. Preferred lanthanide metal cations are lanthanum, cerium, praseodymium, neodymium, promethium, samarium, europium and/or dysprosium cations. Lanthanum, cerium, and praseodymium cations are especially preferred. The lanthanide-metal cations can be in monovalent, divalent and/or trivalent oxidation state, preference being given to the trivalent oxidation state.

Preferred d-metal cations are titanium, vanadium, manganese, yttrium, zirconium, niobium, molybdenum, tungsten, cobalt, ruthenium, rhodium, palladium, osmium and/or iridium cations. Barred from consideration as a d-element cation is the chromium cation in any oxidation state. Vanadium, manganese, tungsten, molybdenum and/or yttrium cations are especially preferred. The d-element cations can be present in monovalent to hexavalent oxidation state, preference being given to a trivalent to hexavalent oxidation state.

The Process for Applying the Coating Material of the Invention

Before the coating material of the invention is applied, in one preferred embodiment of the invention the substrate is clean, in particular of oily and fatty residues, employing preferably detergents and/or alkaline cleaning materials. In a further preferred version of the invention the cleaning with detergents and/or alkaline cleaning materials is followed, and the application of the coating material of the invention preceded, by rinsing with water. In order to remove deposits and/or chemically modified films, especially oxidized films, from the surface of the substrate, in a further preferred embodiment of the invention the rinse step is preceded by mechanical cleaning of the surface, using abrasive media for example, and/or by chemical removal of the surface films, using deoxidizing cleaning materials for example.

The substrate thus pretreated is contacted with the coating material of the invention. This is preferably accomplished by immersing the substrate in a bath or drawing it through a bath comprising the coating material of the invention. The residence times of the substrate in the coating material of the invention amount to preferably 1 second to 15 minutes, more preferably 10 seconds to 10 minutes, and very preferably 30 seconds to 8 minutes. The temperature of the bath comprising the coating material of the invention is preferably between 20 and 90° C., more preferably between 25 and 80° C., and very preferably between 30 and 70° C.

The thickness of the coating produced using the coating material of the invention is preferably, before the drying step, between 5 and 900 nm, particularly preferably between 10 and 800 nm, which, on the basis of the anticorrosion effect, makes it possible to significantly reduce the material used.

Treatment of the substrate with the coating material of the invention is followed preferably by drying of the system comprising substrate and coating material at temperatures between about 30 and 200° C., in particular between 100 and 180° C.; the drying apparatus can be regarded as largely uncritical to the advantageous effect of the coating material of the invention. Where the crosslinking groups B and/or B' are at least partly radiation-curing, the coat of the coating material of the invention is irradiated, preferably in a manner known to the skilled worker by actinic radiation and/or by electron beams, this irradiation taking place, where appropriate, in addition to the thermal treatment.

The coating material of the invention can, surprisingly, be employed on a wide spectrum of substrates and is largely independent of the substrate's redox potential.

Preferred substrate materials are zinc, iron, magnesium, and aluminum, and also alloys thereof, said alloys preferably containing at least 20% by weight of the aforementioned metals. The substrates are preferably formed as metal sheets, as are employed, for example, in the automotive, construction, and mechanical engineering industries. The sheets coated with the coating material of the invention are employed in connection in particular with profiled sheets and with the coil-coating of sheets.

In a further embodiment of the invention the coating materials of the invention are used for sealing cut edges of the above-described sheets, especially for sealing the cut edges of sheets which have already been coated.

In a further embodiment of the invention the above-described substrates, before the coating material of the invention is deposited, are coated with a further corrosion inhibitor which can likewise be deposited electrolessly. Preference is given to corrosion inhibitors having inorganic constituents which exhibit effective adhesion both to the coat of the coating material of the invention and to the uncoated substrate. Inorganic corrosion inhibitors of this kind are described in, for example, EP-A-1 217 094, EP-A-0 534 120, U.S. Pat. No. 5,221,371, and WO-A-01/86016.

In one particularly preferred embodiment of the invention the application of the coating material of the invention is preceded, in a separate step, by application of an aqueous corrosion preventative K having a pH of between 1 and 5 and comprising at least one compound AA having as its cation a lanthanide metal and/or a d-element metal bar chromium and/or as its anion a d-element metallate, bar chromium-containing metallates, and also BB at least one acid capable of oxidation, with the exception of phosphorous and/or chromium acids.

The salt forming component AA has as its cationic constituent lanthanide-metal cations and/or d-metal cations. Preferred lanthanide-metal cations are lanthanum, cerium, praseodymium, neodymium, promethium, samarium, europium and/or dysprosium cations. Lanthanum, cerium, and praseodymium cations are especially preferred. The lanthanide-metal cations can be in monovalent, divalent and/or trivalent oxidation state, the trivalent oxidation state being preferred. Preferred d-metal cations are titanium, vanadium, manganese, yttrium, zirconium, niobium, molybdenum, tungsten, cobalt, ruthenium, rhodium, palladium, osmium and/or iridium cations. Barred from consideration as a d-element cation is the chromium cation in any oxidation state. Vanadium, manganese, tungsten, molybdenum and/or yttrium cations are especially preferred. The d-element cations can be in a monovalent to hexavalent oxidation state, preference being given to a trivalent to hexavalent oxidation state.

The salts of the aforementioned cations of component AA are preferably of very good solubility in water. Particular preference is given to $[cation]_n[anion]_m$ salts (with n and m each $>=1$) having a solubility product SP, i.e., $[cation]^{n*}[anion]^m$, $>10^{-8}*mol^{(n+m)}/l^{(n+m)}$, with very particular preference salts having a solubility product $SP>10^{-6}*mol^{(n+m)}/l^{(n+m)}$. In one especially preferred embodiment of the invention the concentration of the salt or salts (A) in the corrosion preventative is $10^{-1}$ to $10^{-4}$ mol/l, in particular $5*10^{-1}$ to $10^{-3}$ mol/l.

The anions which together with the d-element cations form the salts AA are preferably selected such that the aforementioned conditions for the solubility product SP are met. Preference is given to using anions of oxidizing acids of the elements of transition groups VI, VII and VIII of the Periodic Table of the Elements and also to anions of oxidizing acids of the elements of main groups V and VI of the Periodic Table of the Elements, with the exception of anions of oxidizing acids of phosphorus and chromium, particular preference being given to the use of nitrates, nitrites, sulfites and/or sulfates. Further preferred anions are halides, such as chlorides and bromides in particular.

In a further preferred embodiment of the invention the d-element cations can also be present in the form of complexes with monodentate and/or polydentate, potentially anionic ligands. Preferred ligands are unfunctionalized or functionalized terpyridines, unfunctionalized or functionalized ureas and/or thioureas, unfunctionalized or functionalized amines and/or polyamines, such as EDTA in particular, imines, such as imine-functionalized pyridines in particular, organosulfur compounds, such as, in particular unfunctionalized or functionalized thiols, thiocarboxylic acids, thioaldehydes, thioketones, dithiocarbamates, sulfonamides, thioamides, and, with particular preference, sulfonates, unfunctionalized or functionalized organoboron compounds, such as boric esters in particular, unfunctionalized or functionalized polyalcohols, such as, in particular, carbohydrates and their derivatives and also chitosans, unfunctionalized or functionalized acids, such as difunctional and/or oligofunctional acids in particular, unfunctionalized or functionalized carbenes, acetylacetonates, unfunctionalized or functionalized acetylenes, unfunctionalized or functionalized heterocycles, such as quinolines, pyridines such as in particular imine-functionalized pyridines, pyrimidines, pyrroles, furans, thiophenes, imidazoles, benzimidazoles, preferably mercaptobenzimidazoles, benzothiazoles, oxazoles, thiazole, pyrazoles or else indoles, unfunctionalized or functionalized carboxylic acids, such as, in particular, carboxylic acids which can be attached ionically and/or coordinatively to metal centers, and also phytic acid and its derivatives. Especially preferred ligands are phytic acids, derivatives thereof, and sulfonates, which may have been functionalized.

In a further embodiment of the invention the salts AA contain as their anions d-element metallates which together with the d-element cations or else on their own are able to form the salt AA. Preferred d elements for the metallates are vanadium, manganese, zirconium, niobium, molybdenum and/or tungsten. Vanadium, manganese, tungsten and/or molybdenum are especially preferred. Barred from consideration as a d-element metallate are chromates in any oxidation states. Particularly preferred d-element metallates are oxo anions, such as tungstates, permanganates, vanadates and/or molybdates in particular.

Where the d-element metallates form the salt AA on their own, in other words without lanthanide-metal cations and/or d-metal cations, the abovementioned comments regarding the preferred solubility product SP of such salts apply here as well. Preferred cations of such salts are ammonium ions, phosphonium ions and/or sulfonium ions, with or without substitution by organic radicals; alkali metal cations, such as lithium, sodium and/or potassium in particular; and alkaline earth metal cations, such as magnesium and/or calcium in particular. Particularly preferred ions are the ammonium ions, unsubstituted or substituted by organic radicals, and the alkali metal cations, which ensure a particularly high solubility product SP on the part of the salt AA.

As component BB of the corrosion preventative K use is made of at least one acid which is capable of oxidation, it being used such that the pH of the corrosion preventative is between 1 and 5, preferably between 2 and 4. Preferred acids BB are selected from the group consisting of oxidizing mineral acids, such as, in particular, nitric acid, nitrous acid, sulfuric acid and/or sulfurous acid.

In order to set the pH it is possible where necessary to employ a buffer medium, such as, for example, salts of strong bases and weak acids, such as ammonium acetate in particular.

The continuous phase used for the coating material of the invention is water, preferably deionized and/or distilled water.

In one preferred embodiment of the invention, prior to application of the corrosion preventive K, the substrate is cleaned, especially of oily and fatty residues, employing preferably detergents and/or alkaline cleaning materials. In another preferred version of the invention the cleaning with detergents and/or alkaline cleaning products is followed, and the application of the corrosion preventative K preceded, by a rinse with water. In a further preferred embodiment of the invention, for the purpose of removing deposits and/or chemically modified films, especially oxidized films, from the surface of the substrate, the rinse step is preceded by mechanical cleaning of the surface, using abrasive media for example, and/or by chemical removal of the surface films, using deoxidizing cleaning materials, for example.

The substrate thus pretreated is contacted with the corrosion preventative K. This is preferably accomplished by immersing the substrate in or drawing it through a bath comprising the corrosion preventative K. The residence times of the substrate in the corrosion preventative K amount to preferably 1 second to 10 minutes, preferably 10 seconds to 8 minutes, and more preferably 30 seconds to 6 minutes. The temperature of the bath comprising the corrosion preventative K is preferably between 25 and 90° C., more preferably between 30 and 80° C., and very preferably between 35 and 70° C.

After the substrate has been treated with the corrosion preventative of the invention it is preferred to carry out drying of the system comprising substrate and corrosion preventative, by means of blow drying or by means of drying at temperatures between about 30 and 200° C.; the drying temperature and also the type of drying or drying apparatus can be regarded as being largely uncritical to the advantageous effect of the corrosion preventative K.

In the second step of the preferred process the substrates coated with the corrosion preventative K are coated with the coating material of the invention. This is accomplished preferably by immersing or drawing the coated substrate in or through a bath comprising the coating material of the invention. The residence times of the substrate in the coating material of the invention amount to preferably 1 second to 15 minutes, more preferably 10 seconds to 10 minutes, and very preferably 30 seconds to 8 minutes. The temperature of bath comprising the coating material of the invention is preferably between 20 and 90° C., more preferably between 25 and 80° C., and very preferably between 30 and 70° C.

The thickness of the coating produced using the coating material of the invention is preferably, before the drying step, between 5 and 900 nm, particularly preferably between 10 and 800 nm, which, on the basis of the anticorrosion effect, makes it possible to significantly reduce the material used.

After the substrate has been treated with the coating material of the invention it is preferred to carry out drying of the system comprising the substrate and the coats of the corrosion preventative K and also the coating material of the invention, at temperatures between 30 and 200° C., in particular between 100 and 180° C.; the drying apparatus can be regarded as being largely uncritical to the advantageous effect of the coating material of the invention. Where the crosslinking groups B and/or B' are at least partly radiation-curing, irradiation of the coat of the coating material of the invention, preferably in a manner known to the skilled person, using actinic radiation and/or electron beams, is carried out, where appropriate in addition to the thermal treatment.

The examples given below are intended to provide further illustration of the invention.

EXAMPLES

Example 1

Preparation of the First Tank with the Corrosion Preventative K

In one liter of water 1.77 g (0.01 mol) of ammonium molybdate tetrahydrate are dissolved. The solution is adjusted using nitric acid to a pH=2.5. Counter-buffering with aqueous ammonia solution is used if desired in order to set the aforementioned pH.

Example 2a

Synthesis of the Polymer Component PM for the Coating Material of the Invention

A 4 kg steel reactor is charged with 1016.9 g of DI water and this initial charge is heated to 90° C. Subsequently, at a constant temperature of 90° C., three separate feed streams are metered in parallel and at a uniform rate. Feed stream 1 consists of 90.0 g of dimethylaminopropylmethacrylamide, 240.0 g of methyl methacrylate, 120.0 g of hydroxyethyl methacrylate, 120.0 g of methacrylester 13 (methacrylic ester, average number of C atoms of the linear, saturated alcohol is 13; CAS No. 90 551-76-1; supplier: Degussa, Röhm GmbH, Darmstadt) and 30.0 g of diphenylethylene. Added as feedstream 2 are 165.7 g of a solution composed of 61.0 g of an 85% strength phosphoric acid and 104.7 g of DI water. Feed stream 3 is composed of a solution of 45.0 g of ammonium peroxydisulfate in 105.0 g of DI water. Feed streams 1 and 2 are metered in over the course of 4 hours, feed stream 3 over the course of 4.5 hours. After the end of the addition there is a 2-hour post-polymerization phase at 90° C. The dispersion obtained has a solids content of 37% by weight.

Example 2b

Synthesis of the Cross Linker V for the Coating Material of the Invention 3.1 g (0.008 mol) of cerium(III) chloride heptahydrate in 50 ml of water are introduced as an initial charge. A solution is prepared from 4.1 g (0.025 mol) of 4-hydroxycinnamic acid and 1 g (0.025 mol) of sodium hydroxide in 50 ml of water and adjusted using hydrochloric acid to a pH=7.9. This solution is slowly added to the cerium solution, so that the pH of the cerium solution does not rise above 6. The precipitate is washed with ethanol and water.

1.7 g (0.003 mol) of this cerium complex is reacted at 40° C. for five hours with 9.1 g (2.5% NCO content) of a branched polyisocyanate with 75% dimethylpyrazole blocking (Bayhydur VP LS 2319 from Bayer AG) in 80.1 g of ethyl acetate and 0.7 g of an OH-functional dipropylenetriamine (Jeffcat-ZR 50 from Huntsmann). The product is employed without further purification.

Example 2

Preparation of the Second Tank with the Coating Material of the Invention

In one liter of water 3 g of the polymer component P from Example 2a, and 2 g of the crosslinker V from Example 2b are dissolved. The solution is adjusted using nitric acid to a pH=2.5. Counter-buffering with aqueous ammonia solution is used if desired in order to set the aforementioned pH.

Example 3

Coating of the Substrate with the Corrosion Preventative K and the Coating Material of the Invention The substrate (sheet of galvanized steel) is cleaned in a cleaning solution (Ridoline C72 from Henkel) at 55° C. for 5 minutes and thereafter rinsed with distilled water.

Subsequently the sheet rinsed with distilled water is immediately immersed in the first tank of the corrosion preventative K from Example 1 at 45° C. for 4 minutes. Thereafter the coated sheet is rinsed with distilled water and blown dry with nitrogen.

Directly after that the sheets are immersed in the second tank of the corrosion preventative of the invention from Example 2 at 35° C. for 5 minutes. There forms an invisible to opalescent coating in the $\lambda/4$ region of visible light. Thereafter the coated sheet is rinsed with distilled water and blown dry with nitrogen. The sheet is subsequently dried at 150° C. for 30 minutes.

The sheet thus coated, and the reference samples below, are cut with sheet shears in order to obtain free edges on all the sheets.

The reference used for the of the invention is Gardobond 958 54 (Chemetall GmbH: galvanized steel sheet with phosphating and a zirconium hexafluoride solution afterrinse).

Example 4

Accelerated Corrosion Test with 3% Strength Aqueous Sodium Chloride Solution on the Substrates Coated as Per Example 3

A solution of 3% sodium chloride in free deionized water is used. Substrates which can be utilized here are steel, galvanized steel or zinc alloys. For aluminum and its alloys the sodium chloride solution is additionally adjusted using acetic acid to a pH=3. The samples (3*3 cm) are immersed in 170 ml of this solution and are stored in a desiccators at a humidity of almost 100%. The humid atmosphere is produced by fat-free compressed air which is passed through two wash bottles containing fully deionized water and then flows through the desiccators. This setup ensures a constant atmospheric humidity and a constant carbon dioxide content, the temperature being held at 25° C. Prior to immersion, the samples are weighed on an analytical balance. Untreated reference sheets (steel, galvanized steel) are cleaned in ethanol in an ultrasound bath for 5 minutes. After storage for 24 hours the sheets are removed from the solution and rinsed with the exposed 3% strength sodium chloride solution (about 10 ml of sodium chloride solution per sample side) over a glass beaker, using a disposable pipette. The sheet is subsequently blown dry with nitrogen, then dried at 50° C. for 15 minutes and weighed. Subsequently the sheet is suspended again in a fresh sodium chloride solution of the same concentration. 1 ml of 32% strength hydrochloric acid is added to the used sodium chloride solution in order to dissolve any precipitates. The clear solution obtained is assayed for substrate metal (Zn, Fe, Al, Mg) by means of ICP-OES (inductively coupled plasma—optical emission spectrometry).

The procedure described above is repeated after 24 h, 72 h, 96 h, and 168 h. The measurement is verified by means of a duplicate determination.

Evaluation of the Corrosion Test:
a) ICP-OES Data of the Immersion Solution

The ICP-OES data are standardized for the area of the samples. These data produce a linear plot. Because of the linearity of the corrosion kinetics it is possible to compare the different coatings through the slopes of the graph. The ICP-OES data reproduce the dissolution of the substrate per unit area and unit time and are therefore a direct measure of the corrosion rate which is possible for any particular coating.
b) Weighing of the Samples The weighings provide information, furthermore, on the possibility to what extent the coating allows or does not allow the surface to be passivated. For this purpose the weight loss is converted into molarities and standardized for the area of the samples. The respective substrate given only an alkaline clean is used for comparison of the corrosion kinetics. Then the slopes from the ICP-OES data are shown, in comparison to the blank reference (untreated substrate) and other references.

TABLE 1

Results of the corrosion test

| Substrate | ICP-OES data $(10^{-4} * mol/l * h* cm^2)$ |
|---|---|
| Galvanized steel sheet (uncoated) | 8.14 |
| Galvanized steel sheet coated as per Example 3 | 5.17 |
| Gardobond 958 54 (reference) | 6.17 |

The results of the corrosion tests clearly show the superiority of the coating material of the invention over a conventional corrosion control (reference).

The invention claimed is:

1. A two-stage process for the corrosion-control treatment of a metallic substrate, which comprises
   (I) in a first stage immersing the substrate in a bath of an aqueous corrosion preventative K, which results in conversion at the substrate surface, and
   (II) in a second stage immersing the substrate treated as per stage (I) in a bath of an aqueous coating material comprising, as a coating material, a water-dispersible and/or water-soluble polymer P with a gradient in the concentration of covalently bonded hydrophilic groups along the polymer main chain, the polymer P comprising covalently bonded ligands A, the ligands A being distributed randomly in the polymer P and being capable of forming chelates with metal ions released during the corrosion of the substrate and/or with a surface of the substrate, and crosslinking functional groups B, the crosslinking functional groups B being capable of forming covalent bonds to one or more crosslinkers V.

2. The process of claim 1, wherein aqueous corrosion preventative K comprises
- at least one compound having as its cation a lanthanide metal and/or a d-element metal bar chromium and/or as its anion a d-element metallate, with the exception of metallates containing chromium, and
- at least one acid capable of oxidation, with the exception of phosphorus and/or chromium acids.

3. A process for the autophoretic application of an aqueous coating material to a metallic substrate, comprising depositing an aqueous coating material comprising, as a coating material, a water-dispersible and/or water-soluble polymer P with a gradient in the concentration of covalently bonded hydrophilic groups along the polymer main chain, the polymer P comprising covalently bonded ligands A, the ligands A being distributed randomly in the polymer P and being capable of forming chelates with metal ions released during the corrosion of the substrate and/or with a surface of the substrate, and crosslinking functional groups B, the crosslinking functional groups B being capable of forming covalent bonds to one or more crosslinkers V, wherein the thickness of the coating material on the substrate after autophoretic application is between 5 and 900 nm.

4. The process of claim 3, wherein the hydrophilic groups comprise groups selected from ionic functional groups, primary amine, secondary amine, tertiary amine, amide groups, oligoalkoxy substituents, polyalkoxy substituents, etherified oligoalkoxy substituents, etherified polyalkoxy substituents and combinations thereof.

5. The process of claim 3 for the corrosion-control treatment of a metallic substrate, comprising
- immersing a metallic substrate in a bath of the aqueous coating material, wherein the metallic substrate is immersed in the bath for a time of 1 second to 15 minutes and at a temperature between 20 and 90° C.

6. The process of claim 3, wherein following the deposition of the coating material, the substrate is aftertreated thermally at temperatures between 50 and 200° C. and/or by irradiation.

7. The process of claim 3, wherein the substrate contains at least 20% by weight of a metal selected from the group consisting of Fe, Al and/or Zn.

8. A process for the autophoretic application of an aqueous coating material to a metallic substrate, comprising depositing an aqueous coating material comprising, as a coating material, a water-dispersible and/or water-soluble polymer P with a gradient in the concentration of covalently bonded hydrophilic groups along the polymer main chain, the polymer P comprising covalently bonded ligands A which form chelates with metal ions released during the corrosion of the substrate and/or with a surface of the substrate, and crosslinking functional groups B, the crosslinking functional groups B being capable of forming covalent bonds to one or more crosslinkers V, wherein the thickness of the coating material on the substrate after autophoretic application is between 5 and 900 nm, further wherein the ligands A are distributed randomly in the polymer P.

* * * * *